(12) United States Patent
Cueto

(10) Patent No.: US 9,765,742 B2
(45) Date of Patent: *Sep. 19, 2017

(54) FUEL INJECTION FEEDBACK SYSTEM AND METHOD

(71) Applicant: Omar Cueto, Jacksonville, FL (US)

(72) Inventor: Omar Cueto, Jacksonville, FL (US)

( * ) Notice: Subject to any disclaimer, the term of this patent is extended or adjusted under 35 U.S.C. 154(b) by 549 days.

This patent is subject to a terminal disclaimer.

(21) Appl. No.: 14/268,699

(22) Filed: May 2, 2014

(65) Prior Publication Data

US 2014/0230531 A1  Aug. 21, 2014

Related U.S. Application Data

(60) Division of application No. 13/309,546, filed on Dec. 1, 2011, now Pat. No. 8,746,050, which is a continuation-in-part of application No. 13/153,417, filed on Jun. 21, 2011, now Pat. No. 8,205,491, which is a division of application No. 12/233,615, filed on Sep. 19, 2008, now Pat. No. 7,975,535.

(51) Int. Cl.
  G01M 15/04 (2006.01)
  F02M 65/00 (2006.01)
  F02M 57/00 (2006.01)
  F02D 41/40 (2006.01)

(52) U.S. Cl.
  CPC ........ F02M 65/001 (2013.01); F02M 57/005 (2013.01); *F02D 41/40* (2013.01); *F02D 2200/0614* (2013.01); *F02D 2200/0618* (2013.01); *F02M 2200/24* (2013.01); *G01M 15/04* (2013.01)

(58) Field of Classification Search
  USPC .............................. 73/114.45, 114.46, 114.48
  See application file for complete search history.

(56) References Cited

U.S. PATENT DOCUMENTS

| | | | | |
|---|---|---|---|---|
| 4,404,841 A | * | 9/1983 | Franke | G01L 23/22 73/114.09 |
| 4,661,695 A | * | 4/1987 | Mori | F02P 5/1455 250/227.11 |
| 7,878,050 B2 | * | 2/2011 | Cueto | F02M 65/003 73/114.48 |
| 7,975,535 B2 | * | 7/2011 | Cueto | F02M 65/001 73/114.48 |

(Continued)

FOREIGN PATENT DOCUMENTS

| | | |
|---|---|---|
| EP | 1854993 A1 | 11/2007 |
| WO | 9835210 A1 | 8/1998 |
| WO | 2007047106 A2 | 4/2007 |

*Primary Examiner* — Eric S McCall
(74) *Attorney, Agent, or Firm* — Stephen E. Kelly; Hill Ward Henderson, P.A.

(57) ABSTRACT

A fuel injection feedback system comprises a light source disposed inside a fuel injector, an optical sensor disposed inside the fuel injector, and a computing device electronically connected to the optical sensor. The light source is a device configured to emit light capable of being reflected by cavitation. The light source could be disposed on or within the needle or nozzle of the fuel injector, or at a variety of other locations inside the fuel injector. The optical sensor is configured to detect an intensity of light caused by receiving light reflected from cavitation occurring inside the fuel injector.

20 Claims, 14 Drawing Sheets

(56) References Cited

U.S. PATENT DOCUMENTS

| | | | | |
|---|---|---|---|---|
| 8,205,491 B2* | 6/2012 | Cueto | ............... | F02M 65/001 |
| | | | | 73/114.49 |
| 8,746,050 B2* | 6/2014 | Cueto | ............... | 73/114.48 |
| 2004/0031326 A1* | 2/2004 | Lenzing | ............... | G01L 9/0077 |
| | | | | 73/800 |
| 2009/0277258 A1* | 11/2009 | Cueto | ............... | F02M 65/001 |
| | | | | 73/114.48 |
| 2009/0279087 A1* | 11/2009 | Cueto | ............... | F02M 65/003 |
| | | | | 356/338 |
| 2011/0239751 A1* | 10/2011 | Cueto | ............... | F02M 65/001 |
| | | | | 73/114.48 |
| 2012/0073361 A1* | 3/2012 | Cueto | ............... | F02M 65/001 |
| | | | | 73/114.45 |

\* cited by examiner

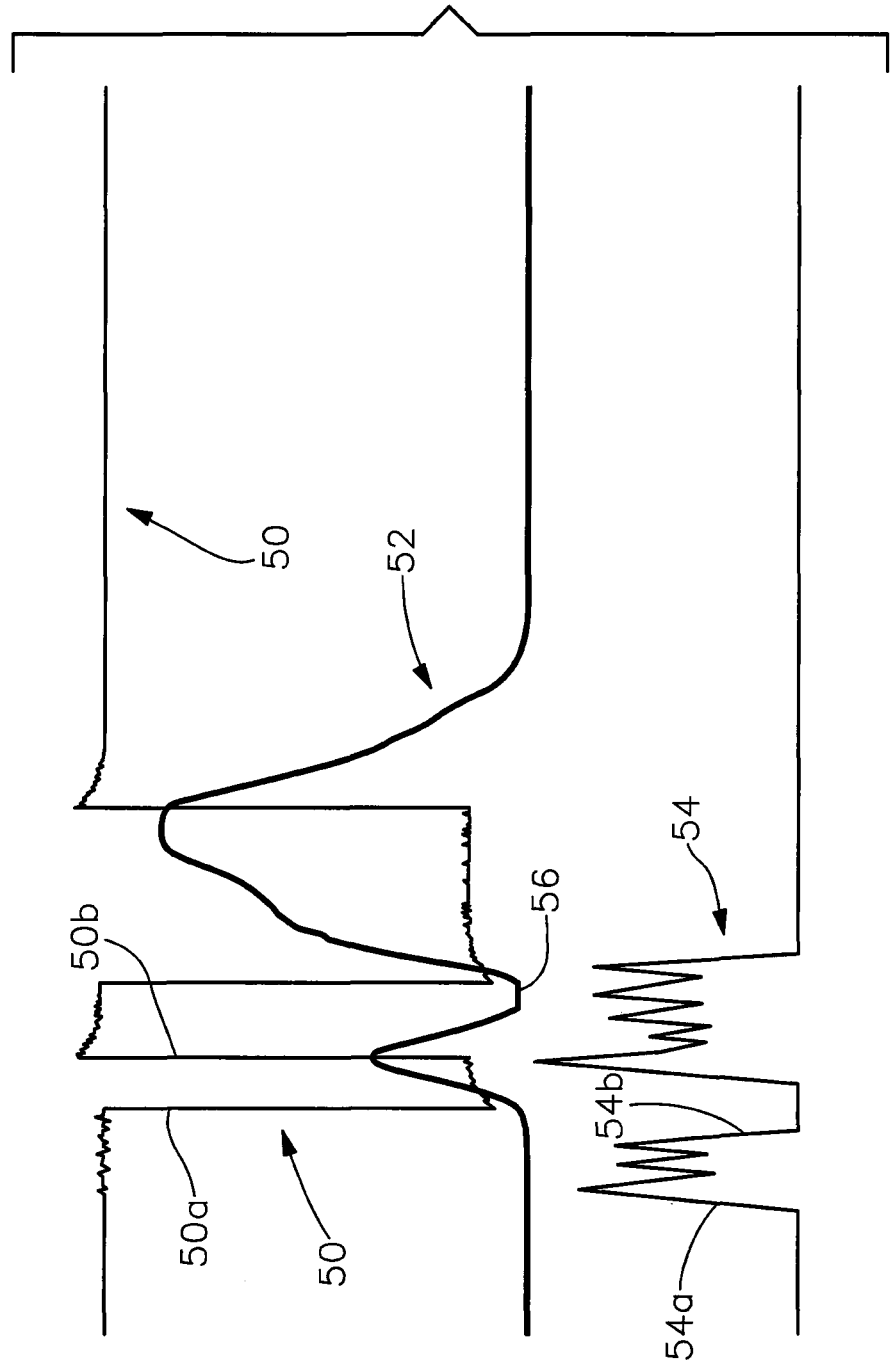

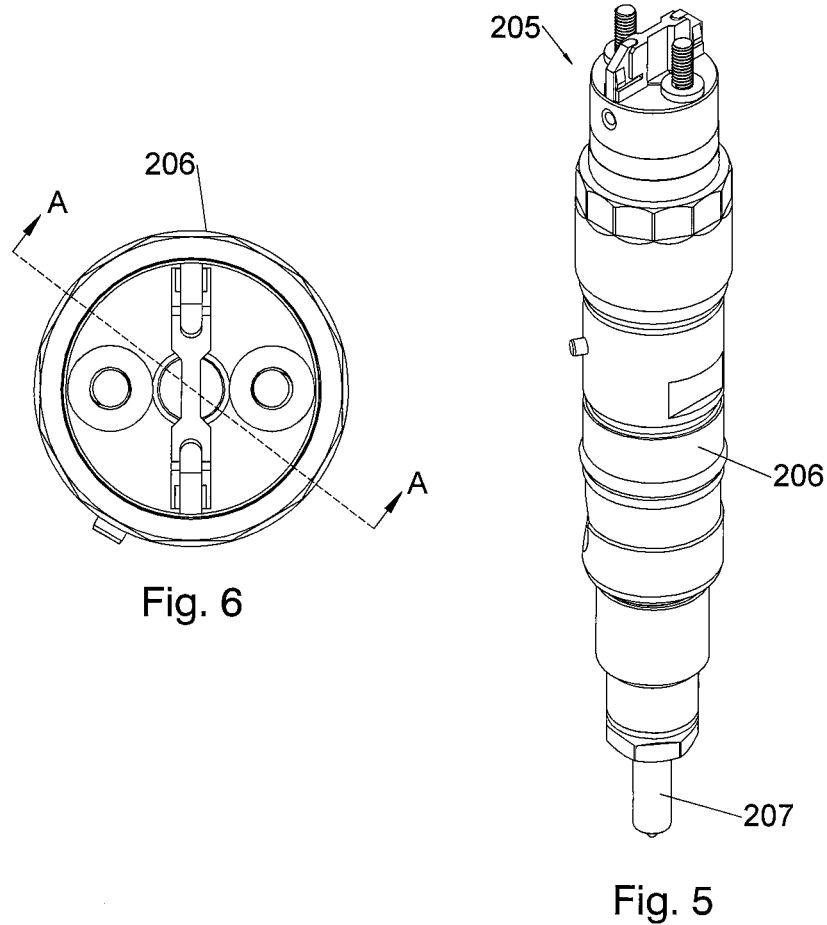

FUEL INJECTION FEEDBACK SYSTEM AND METHOD

RELATED APPLICATION

The present application claims priority under 35 U.S.C. §120 as a divisional of U.S. patent application Ser. No. 13/309,546, filed Dec. 1, 2011, which is a continuation-in-part of U.S. patent application Ser. No. 13/153,417, filed Jun. 21, 2011, now U.S. Pat. No. 8,205,491, which is a divisional of U.S. patent application Ser. No. 12/233,615, filed Sep. 19, 2008, now U.S. Pat. No. 7,975,535.

TECHNICAL FIELD

The present invention relates to a system and method for obtaining feedback from a fuel injector. In greater detail, the present invention relates to a method and apparatus for determining the quantity and rate shape of injection by a fuel injector for monitoring the injector.

BACKGROUND OF THE INVENTION

In recent years, increasing concerns over fuel economy and environmental sensitivity have driven the transportation industry to develop new technologies to address these concerning issues. In fuel injection systems, fuel economy and emissions are driven by fuel injection characteristics. For example, the start, end, duration, and rate of fuel injection vary according to machining tolerances, aging, fuel properties, and fuel pressure measurement. The variability in fuel injection causes a corresponding variance in the exhaust emissions, power, and fuel consumption. Measuring the fuel injection characteristics allows for a closed loop control to reduce the variability, emissions and fuel consumption and to better optimize combustion for different operating fuels.

Fuel properties have a large influence on engine performance and fuel consumption. The variation in diesel alone at the local pumping stations can vary fuel consumption by up to 4% and emissions of NOx, PM, CO, and HC by 12%, over 50%, 40%, and 17%, respectively. Typically, engine calibrations have assumed fuel properties of the operating fuel and therefore use the same injection timing conditions regardless if the engine is operating on diesel or biodiesel. From feedback on the injection and combustion characteristics, injection timing can be modified to optimize combustion for different fuels.

Future engines may use advanced combustion methods, such as homogeneous compression charge ignition (HCCI) and premixed charge compression ignition (PCCI). Advanced combustion engines are very sensitive to injection timing and combustion and require continuous adjustment of ignition timing. A combustion feedback mechanism is therefore required. Laboratory research engines studying advanced combustion typically use in-cylinder pressure transducers, which are expensive and require space in the combustion chamber.

Cavitation is a natural phenomenon that occurs when a liquid experiences a very rapid pressure drop from high pressure to relatively low pressure. This pressure drop causes cavities, or bubbles, to form inside the liquid, and these cavities are called "cavitation." With a fuel injector, for example, the fluid inside the injector can approach 30,000 psi, and when it is injected into a spray chamber or combustion chamber of an engine the fluid pressure can drop to atmospheric levels in a matter of milliseconds. As a result of this pressure drop, the fluid flowing through the fuel injector cavitates in multiple locations inside the fuel injector, as well as in the spray chamber or combustion chamber immediately outside the nozzle of the fuel injector, as discussed above.

Therefore, what is needed is a fuel injection feedback device adapted to be implemented inside a fuel injector of an operating combustion engine.

SUMMARY

The fuel injection feedback system generally comprises an optical sensor and a computing device electronically connected to the optical sensor. The optical sensor is disposed inside a fuel injector, said fuel injector having a nozzle with an orifice, said optical sensor oriented to receive light from within the fuel injector. The optical sensor is a device configured to receive light from its surroundings. For example, the optical sensor is configured to detect an intensity of light caused by receiving light reflected from cavitation. The computing device is configured to detect a disturbance in the intensity of light received by the optical sensor as a function of time. The computing device is any computer or electronic device capable of detecting changes in the intensity of light received by the sensor and computing the time duration of such light disturbance. The light "disturbances" are a variance in the intensity of light received by the optical sensor.

Generally, the beginning of a light disturbance indicates the start of an injection pulse, and the end of the disturbance indicates the end of the injection pulse. For example, the start of the disturbance can indicate the formation of cavitation, thus indicating the start time of the fuel injection pulse. The disappearance of the light disturbance then indicates the disappearance of the cavitation, thus indicating the stop time of the fuel injection pulse. The computing device compares the start time and stop time of the cavitation to calculate the time duration of the existence of the cavitation, and therefore the approximate duration of the injection pulse. This time duration can be multiplied by the volumetric flow rate indicated by a flow meter fluidly connected to the fuel injector, thus calculating the approximate amount of fluid injected during that particular fuel injection pulse.

In another embodiment, the fuel injection feedback system comprises a light source configured for installation inside a fuel injector, an optical sensor configured for installation inside a fuel injector, and a computing device electronically connected to the optical sensor. The light source is a device configured to emit light capable of being reflected by cavitation. For example, the light source could be a laser, one or more LED lights, an emitting fiber of a fiber optic assembly, or any other source of light. It should be appreciated that the light source could be disposed on or within the needle, on the interior surface of the housing, or at a variety of locations inside the fuel injector.

In one embodiment, a light source inside the fuel injector is used to direct light toward the internal edge of the orifice. The light source is configured to emit a constant intensity of light, and the sensor will receive a constant intensity of light reflected from within the fuel injector when no cavitation is present. When the cavitation forms near the internal edge, the cavitation begins reflecting the light instantly upon formation, and the light sensor inside the fuel injector receives the additional light reflected from the cavitation.

In another embodiment, the light source and optical sensor comprise a fiber optic assembly. That is, the light source comprises an emitting fiber optic, and the optical sensor comprises a detecting fiber optic. In this embodiment, fiber optic conduits are drilled into the body to facilitate installation of one or more strands of fiber optics. The nozzle cap and needle are also drilled as needed to create additional conduits for installation of fiber optic fibers.

BRIEF DESCRIPTION OF THE DRAWINGS

FIG. 4 is a graph of the injection event measuring the start and stop times of injection by optical detection, electrical current to the injector and by the pressure trace.

FIG. 5 is an isometric view of a typical fuel injector.

FIG. 6 is a top view of a typical fuel injector.

DETAILED DESCRIPTION OF THE INVENTION

Disclosed is both an apparatus and method for quantifying an injection event including both multiple pulse and single pulse injection events. The apparatus includes a pressure chamber for isolating a portion of the injection event. By isolating the event, the apparatus reduces the pressure waves and reflections which can create "noise" in detecting the injection pressure. The apparatus may further include detecting the start and stop times of injection using an optical timing device based upon the opaque properties of cavitation.

While the present apparatus and method are especially advantageous when implemented to measure fuel injection quantity, variation, and/or rate of multi-pulse injections, such may also be used to measure the parameters of fuel injectors operable in a conventional, single injection pulse manner. As can be appreciated by one of ordinary skill in the art, multi-pulse common rail injection systems may be operated in a conventional manner to provide a single pulse injection. The present invention may be used to accurately measure both single and multiple pulse injections.

The term "light" is used herein to encompass the detectable electromagnetic spectrum capable of being scattered by the cavitation produced by the injected liquid. In one embodiment, "light" may be defined as the viewable light of the electromagnetic spectrum.

Referring now in greater detail to the drawings in which like numerals indicate like items throughout the several views, FIGS. 1-4 depict the present apparatus and method of quantifying an injection event including both multiple pulse and single pulse injection events, in the various embodiments of the present invention.

Figure 1:
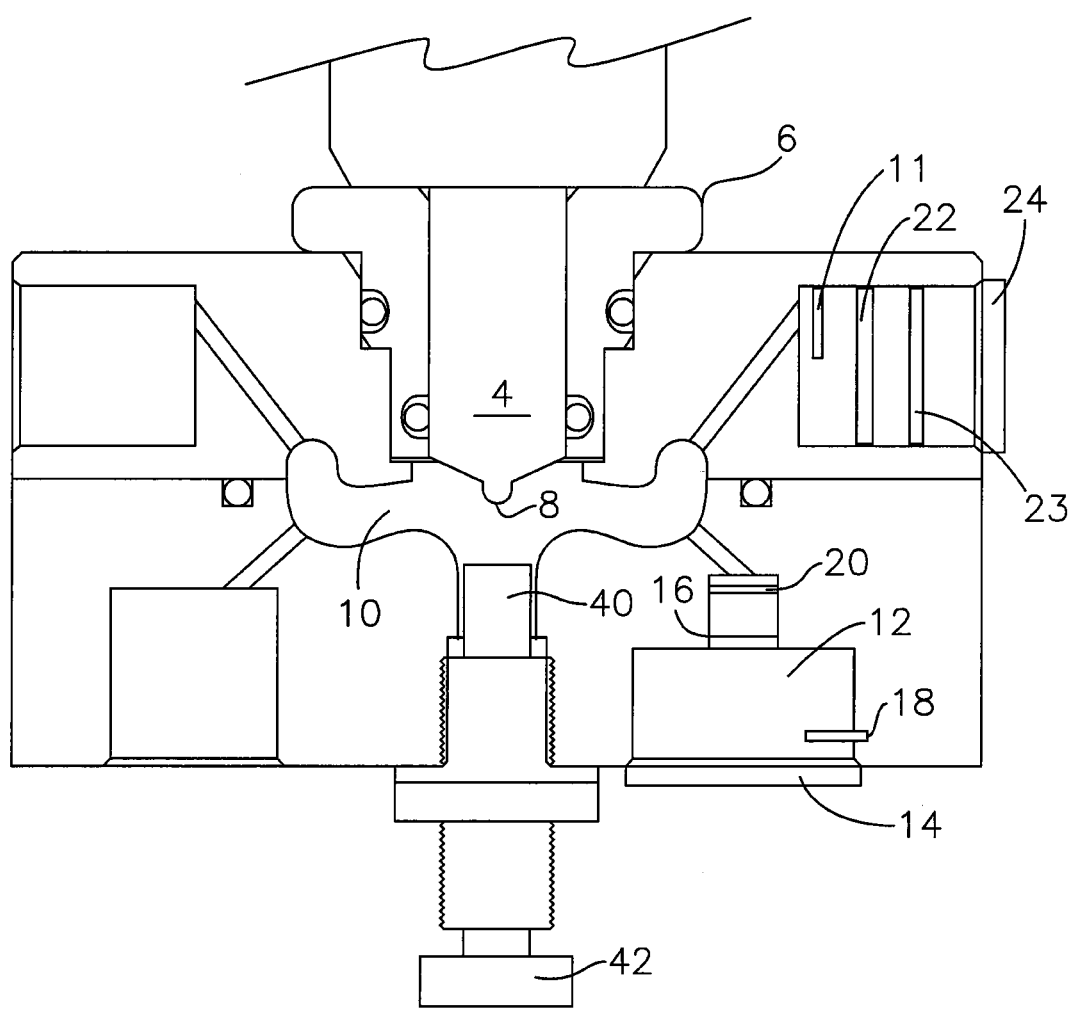
FIG. 1 is a schematic illustration of one embodiment of the present apparatus for testing a fuel injector in accordance with one embodiment of the present invention.

FIG. 1 illustrates the present apparatus for testing fuel injectors. Illustrated within the figure is a future assembly 6 capable of receiving a fuel injector 4 and may include a bushing of varying sizes to accommodate various injector of different sizes. The fixture assembly 6 includes an opening sized to fit a fuel injector 4 to be tested. The fuel injector 4 is inserted into the receiving opening of the fixture assembly and secured within the fixture assembly 6. The fuel injector 4 may provide a single pulse injection, or a multi-pulse injection. The fuel injector 4 may be fluidly connected to a fuel supply (not shown) for providing pressurized fuel to the fuel injector 4.

While fuel is described as being provided, it is contemplated by the Applicant the term "fuel" includes any liquid which can be injected via the spray tips of the injector 4.

An embodiment of the spray chamber 10 is illustrated in FIG. 1 showing the spray tip 8 of the injector 4 fitted within the spray chamber 10. As shown in FIG. 1 the spray chamber 10 is formed from a cavity created within the fixture assembly 6. The spay chamber 10 may be formed in two parts for machining purposes and have a pancake appearance. However, the spray chamber 10 may have various configurations and dimensions.

Fluidly connected to the spray chamber 10 is a pressure chamber 12 housing a pressure sensor 14. The pressure sensor 14 is adapted to measure the pressure changes of the fuel or liquid within the pressure chamber 12 to provide a pressure output, e.g. output signal. The pressure changes correspond to the amount of fuel injected by the fuel injector 4, and is correlated to the rate shape peak of the injection when the injector is actuated. The pressure within the pressure chamber 12 corresponds to the pressure within the spray chamber 10.

An isolating orifice 16 regulates and isolates the flow of fluid from the spray chamber 10 to the pressure chamber 12 to greatly reduce noise when detecting a pressure reading. The isolating orifice 16 may be a fixed orifice or a variable orifice. Such noise is typically caused by the swirling pressure waves and reflections associated with the injection event. In greater detail the isolating orifice 16 may be a metering valve provided for regulating and restricting the flow of fluid from the spray chamber 10. The metering valve may be a needle valve used to restrict the flow of the injected liquid between the spray chamber 10 and the pressure chamber 12. The isolating orifice 16 is fluidly connected to both the spray chamber 10 and the pressure chamber 12.

Additionally, as shown in FIG. 1 the fixture assembly 6 may include a bleed valve 18 for allowing air to be purged from fixture assembly 6 or pressure chamber 12 before measurement begins. Furthermore, a valve assembly 20 can be fluidly connected to the spray chamber and pressure chamber 12 for closing the pressure chamber 12 to the spray chamber 10 may be included in an embodiment of the present apparatus.

A flow meter 24 is included within the present apparatus is fluidly connected to the spray chamber 10. The flow meter 24 is adapted to measure the flow of liquid dispersed by the spray tip 8 of the injector 4 during an injection event. The flow meter 24 may be for example a highly accurate electronic positive displacement flow meter. The present apparatus is not limited by any one type of flow meter.

Additionally included in an embodiment is a valve assembly 22 as shown in FIG. 1 is fluidly connected to both the flow meter 24 and the spray chamber 10. The valve assembly 22 may be for example an adjustable metering valve with a position sensing stepper motor or servo motor attached for automation positioning.

In an additional embodiment, a dampener 23 is included for dampening the flow fluctuations to the flow meter 24. The dampener 23 is placed before and is in fluid communication with the flow meter 24 so as to dampen such flow fluctuations. The dampener 23 may be also located in the spay chamber 10. In an embodiment, the working dampening of the dampener 23 is about 15 times less than the natural resonator frequency is about 130 Hz in an embodiment. Thus, 15 times less than the natural resonator frequency works out to be about less than 10 Hz, (130/15=8.6 Hz). In one embodiment the dampener 23 may be a small low pressure gas in elastomer bladder type pulsation damper. Other types of dampeners 23 may be used in conjunction with the present apparatus such as spring/bellows dampers and the like.

In at least one embodiment, the apparatus comprises a computing device 42 for receiving input from the sensors for providing injection information quantifying the injection event and resulting pulses. The computing device 42 stores the various outputs from the pressure sensor 14, the flow meter 24, and the fiber optic assembly 40. Example additional sensors include those providing temperature readings 11 and current probes. In one embodiment the optical detection assembly and some or all of the functions of the computing device may be combined into one unit performing all or part of the functions of both. For example a power amplifier, such as that available from Panasonic Electric Works Corporation of America of New Providence, N.J., part number FX-300.

After a predetermined number of consecutive injection events are measured and stored, the computing device 42 may average the injection flow measured by the flow meter 24 with the pressure 14 output. In this regard, the computing device 42 may be provided with a software program therein for performing and/or facilitating such computations. Corrections to the calculated values may be made to compensate for back pressure, temperature, and viscosity of the fuel, to obtain the desired injection information.

A further embodiment includes combining the flow meter 24 output, pressure sensor 14 output and the output acquired from the fiber optic assembly 40 which determines the start and stop times for the injection event. By combining the above, the present apparatus is able to achieve in an embodiment a resolution of about 50 micro seconds. It also contemplated in a further embodiment that resolutions of 1 to 10 micro seconds are possible. Also contemplated are resolutions of less than 1 micro second.

Figure 3:
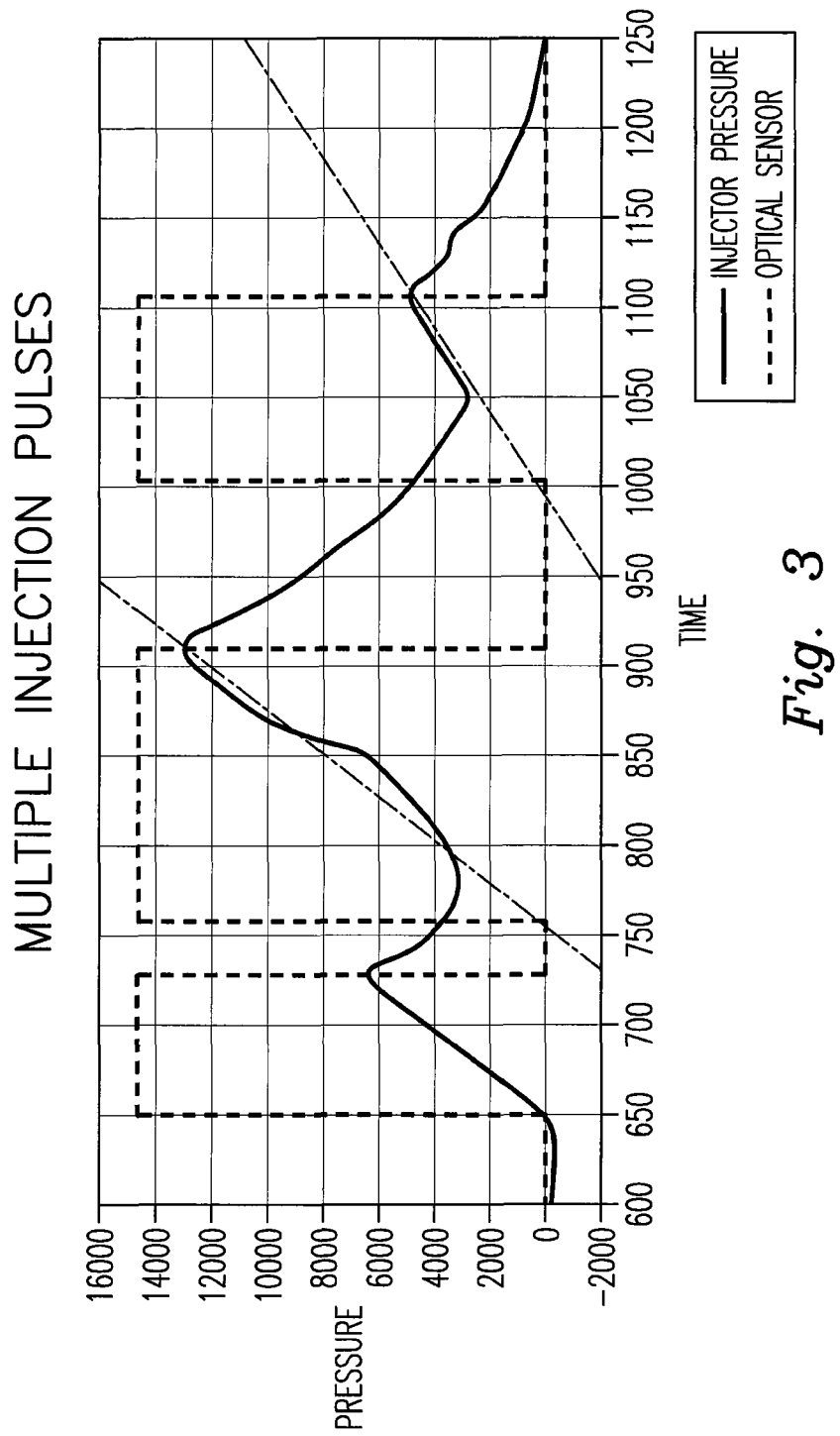
FIG. 3 depicts overlapping multiple injection pulses shown as solid lines and the optical pickup sensor or diode detector sensor or power amp of the present apparatus showing the start and stop times for injection as broken lines on the graph such that the slanted line going from the start of injection time to the peak of injector pressure can be used to extrapolate the rising pressure waveform to calculate volumetric flow rates.

As shown in FIG. 3, there is depicted overlapping multiple injection pulses and the differentiation of the pulses resulting in the extremely fine resolution discussed above. Using only the injector pressure waveform (as shown as a solid line), the start of injection or valve opening of the 2nd and 3rd pulses are not discernable. By combining the pressure waveform with the optical sensor waveform (as shown in broken lines), the precise location of valve activation (opening) coincides with the positive going edge of the optical sensor waveform. The slanted extrapolation line, as shown in FIG. 3, rising from the start of injection time (broken line, as determined by the optical pickup sensor or diode detector sensor fiber optic waveform, up to the peak of the injection pressure (solid line, as determined by the injector pressure waveform) may be used to extrapolate the rising pressure waveform which can be used to calculate volumetric flow rates represented by the area under the resulting curve.

The start and stop times of injection are determined using the opaque properties of cavitation and its ability to scatter light which is detected in the present apparatus as an increase in intensity of light. The injection event creates cavitation within the spray chamber 10 as the liquid exits the spray holes of the spray tip 8. The start and stop times of injection can be determined by the increase and decrease of intensity of light present within the spray chamber 10.

Cavitation detection may be further enhanced by adding backpressure to the spray chamber 10 of up to about 1.5 to 3 percent of the injector pressure, or in an alternative embodiment about 2 percent. Thus, for example if the injector pressure is 1000 psi the back pressure could be about 20 psi. Backpressure essentially "sharpens" or focuses the cavitation spray plume. If too much back pressure is added the cavitation plume will dissipate.

Intensity of Light

Cavitation and injection are detected by the increase of intensity of light within the spray chamber 10. Light is provided into the spray chamber in one embodiment via a fiber optic 44. However, in further embodiments the light may be introduced into the chamber via any known means such as through ports in the spray chamber 10, diodes within the chamber and other known means. The light may be any detectable electromagnetic radiation of the electromagnetic spectrum susceptible to the opaque properties of the cavitation produced by the sprayed liquid.

Figure 2:
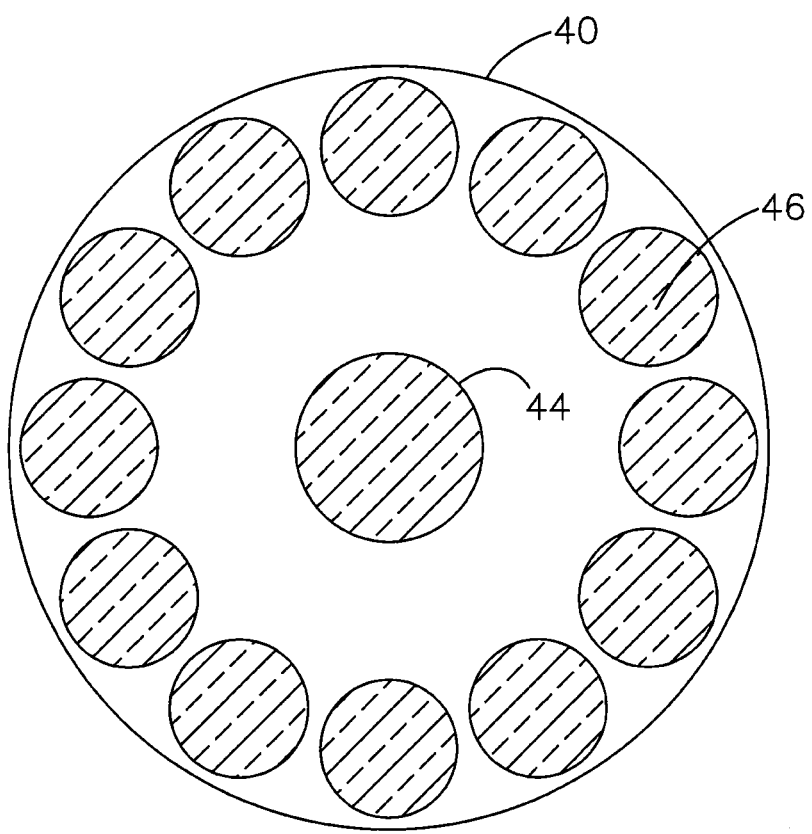
FIG. 2 is a cross sectional view of an embodiment of the fiber optic assembly having a plurality of detecting fibers and one emitting fiber providing light to the spray chamber.

In one embodiment, as illustrated in FIG. 2, a fiber optic assembly 40 is used to both introduce light into the spray chamber 10 and to detect the intensity of the light within the chamber 10. As illustrated, various fiber optics 46 surround a core optic 44 within the fiber optic assembly 40. The fiber optics surrounding 46 the core optic 44 may in an embodiment detect the intensity of light within the chamber and the core optic 44 transmits a light into the chamber 10. The number of detecting fibers 46 and emitting fibers 44 may vary from that depicted in FIG. 2. In one embodiment, the distance to nozzle 4 and fiber 40 is about ¼ of an inch. Furthermore, the tip 8 of the nozzle 4 can be colored with gun blue to darken the chrome surface of the nozzle to help reduce the reflection when there is no injection. Furthermore, gun blue may be added to the interior of the chamber 10 to reduce reflections.

The fiber optic assembly 40 may be positioned just before the spray tip 8 forming a gap between the fiber optic assembly 40 and the spray tip 8. Typically, the gap is less than 0.5 inches, and in a further embodiment the gap is less than 0.25 inches and in a further embodiment the gap is less than 0.1 inches.

The fiber optic assembly 40 may be operatively connected to a power amplifier then to computing device 42 providing light to the emitting optic fiber 44 and acquiring a detected light intensity from the detecting fibers 46. The computing device 42 may provide light to the emitting optic fiber 44 via a diode. The computing device 42 further quantifies the acquired light from the detecting fibers 46 and assigns the detected light an intensity value. For example, the light may be assigned a value based on units of LUX or LX.

The computing device 42 detects an injection event by comparing a background reading of light intensity to an increase in light intensity reading. The background intensity reading is a light intensity from nozzle tip in the spray chamber 10 when cavitation is absent. This reading may be labeled as "Object Absent". The computing device 42 compares any new light intensity reading acquired to the "Object Absent" light intensity value. An increase in light intensity above the "Object Absent" value would indicate the present of cavitation within the spray chamber 10. Of course various measures may be taken to compare only values of certain amount of intensity over the "Object Absent" value to indicate cavitation. The "Object Present" value may represent the increased light intensity acquired by the computing device 42 in a cavitation event.

In greater detail, cavitation indicates an injection event within the spray chamber 10. The start and stop times of cavitation correlate to the start and stop times of injection by the injector 4. Cavitation causes the light that would normally bounce off of the nozzle tip 8 and surrounding spray chamber 10 area to be refracted and scattered by the bubbles and increasing the light intensity that is picked up by the receiving fibers 46 and passes through to the optical circuit on the computing device. The computing device 42 takes the signal generated and assigns it a numerical value quantifying the light intensity in units of LUX or LX. The computing device 42 is taught to view this intensity as "Object Present" and the computing device 42 assumes a threshold value in between the "Object Present" and "Object Absent" intensities.

FIG. 4 depicts the injection event graphically measuring the start and stop times of injection by optical detection 50, electrical current 54 and pressure trace 52. As the dwell time between multiple injection events shortens, an overlap 56 in the pressure trace occurs.

In the present apparatus, injectors may be tested by combining the three signals described above. The electrical current signal 54 is the detection of the current applied to the solenoid or piezoelectric actuator triggering the injection event. The start time of injection 54a and stop time for injection 54b can be seen in the electrical current signal 54. The electric current signal 54 essentially measures the start and stop times of injections based upon when the injector was told to start and stop the injection event.

The optical detection 50 signal of the present apparatus indicates the presence and absence of cavitation within the spray chamber 10. The presence of cavitation indicates the start of injection and the absence indicates the end of injection. The start of injection 50a and end of injection 50b can be seen in the optical detection 50 signal.

The final signal used is the pressure trace 52, which shows, in real time, the calibrated pressure injection profile.

In the measuring of multiple injections of an injector two injection patterns are produced corresponding to short and long dwell times between injections. Where the dwell interval between injection events is long, no overlap between the pressure traces 52 is detected. For long dwell times a simple integration of the pressure trace 52, calibrated through mass balanced measurement allows one to obtain quantitative information related to each individual injection event.

However, in determining quantitative information for injection events having short dwell times, cross correlation is required between the optical signal 50 and the pressure trace 52. Cross correlation is needed due to the overlap 56 in the pressure traces 52.

Application Internal to the Fuel Injector

Performance of the injector 205 can be analyzed in terms of how much fluid is dispensed in each pulse of a fluid injection event. A fluid injection event can be a single pulse or a multi-pulse event. In the single pulse event, there is only one injection, of fluid emitted by the fuel injector 205. A multi-pulse event comprises two or more injections of fluid that are emitted from the fuel injector 205. In a typical multi-pulse injection, the first and last pulses may be pre-burn, and post-burn, respectively, and the intermediate pulses are typically used for the combustion that drives the engine. Regardless of the number of pulses in the injection event, measuring, monitoring, and testing the performance of the fuel injector 205 requires an understanding of how much fluid is dispensed in each pulse. The present apparatus and method uses cavitation to measure the per-pulse amount of fluid by using a volumetric flow meter and the time duration of each pulse of injected fluid to calculate the amount of fluid injected during that particular pulse. In one embodiment, the fuel injection feedback system and method function by directing light at cavitation occurring inside the fuel injector 205 and receiving the light reflected from the cavitation to determine the time duration of the cavitation, and therefore the injection pulse, as described in more detail below. As used in this discussion, cavitation occurring outside the fuel injector 205, or "external cavitation," means the cavitation plume emitted from the fuel injector 205 into a spray chamber, as discussed above. By contrast, cavitation occurring inside the fuel injector 205, or "internal cavitation," means cavitation other than that emitted from the fuel injector 205, such internal cavitation including, without limitation, cavitation occurring within the body 206 of the fuel injector, within an orifice 208 in the nozzle 207, or elsewhere inside the injector.

As used in the following discussion, the terms "fuel" or "fluid" include any fluid that is capable of cavitating, and that can be injected via the nozzle of the injector 205, including, without limitation, diesel, gasoline, other petroleum products, biofuels, or other fluid capable of use in a combustion engine, or any test fluid used for the purpose of testing the fuel injector.

In another embodiment, referring generally to FIGS. 5-10, the system and method are implemented inside a fuel injector 205, such as a fuel injector 205 installed inside an operating combustion engine. A typical fuel injector 205, shown in FIGS. 5-7, has a body 206, a nozzle 207, a needle 210 having a tip 209, and a nozzle cap 211. The body 206 comprises a flow channel 212 for channeling the fuel or fluid to the nozzle 207. The nozzle 207 has a housing 213 that forms a hollow cylindrical portion enclosing a needle 210.

There is generally a space between the exterior surface 214 of the needle 210 and the interior surface 215 of the housing 213, where the space forms a reservoir 216 for fluid inside the nozzle 207. The bottom of the housing 213 comprises a seat 217 against which the needled 210 contacts to close the fuel injection nozzle 207 and seal it from the flow of fluid. The nozzle 207 comprises injection orifices 208 penetrating the wall of the housing 213, thus permitting passage of fluid from the reservoir 216 of the injector 205 into a receiving chamber 218. The receiving chamber 218 is the chamber into which the fuel injector 205 is injecting fluid, and the receiving chamber 218 may be the spray chamber of a testing apparatus, the cylinder of a piston, or more generally the combustion chamber of the engine, or the like. In use, the nozzle 207 is closed when the needle 210 is in a downward position in full contact with the seat 217, thereby sealing the orifices 208 of the nozzle 207 from fluid flow. A fuel injection pulse, or "shot," occurs when the needle 210 rises and loses contact with the seat 217, thereby opening a flow passage between the reservoir 216 and the chamber 218. Fluid then flows from the reservoir 216 through the orifices 208 and into the receiving chamber 218. Fluid flow continues until the needle 210 is lowered into contact with the seat 217, thereby sealing the orifices 208 from continued flow.

Cavitation often occurs in the general area of the nozzle 207, such as inside the orifices 208 or in the area of the needle seat 217. This area is typically called the "sac" of the nozzle 207, but some styles of nozzles 207 are sac-less (for example the VCO). There is more than one place to monitor cavitation inside of an injector, including, without limitation, in the control valve area 225. Cavitation will occur in the control valve area (See FIG. 7) when power from the engine control module commands the injector actuator (solenoid or piezo) to inject fuel. Depending what model or type of injection system, cavitation occurs at the start of the injection, the end of the injection, or both.

Figure 9:
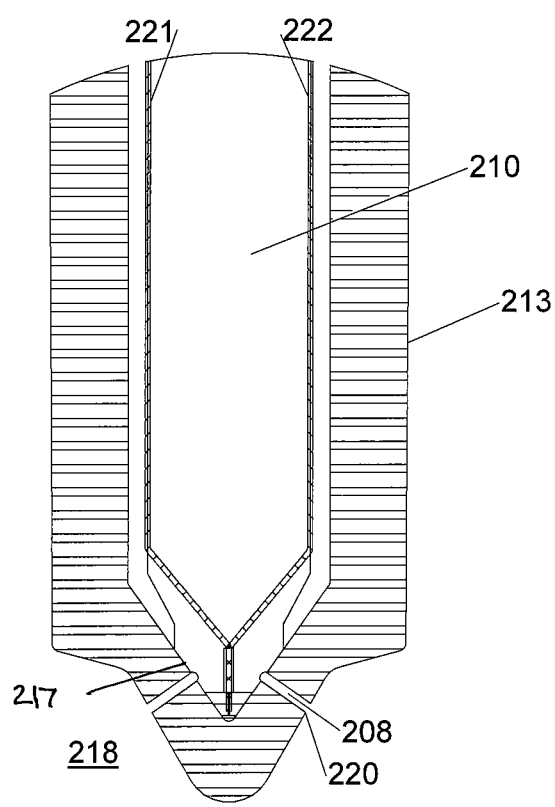
FIG. 9 is an enlarged cross section of the nozzle showing the needle in contact with the seat, thereby sealing the orifices from fluid flow.
Figure 10:
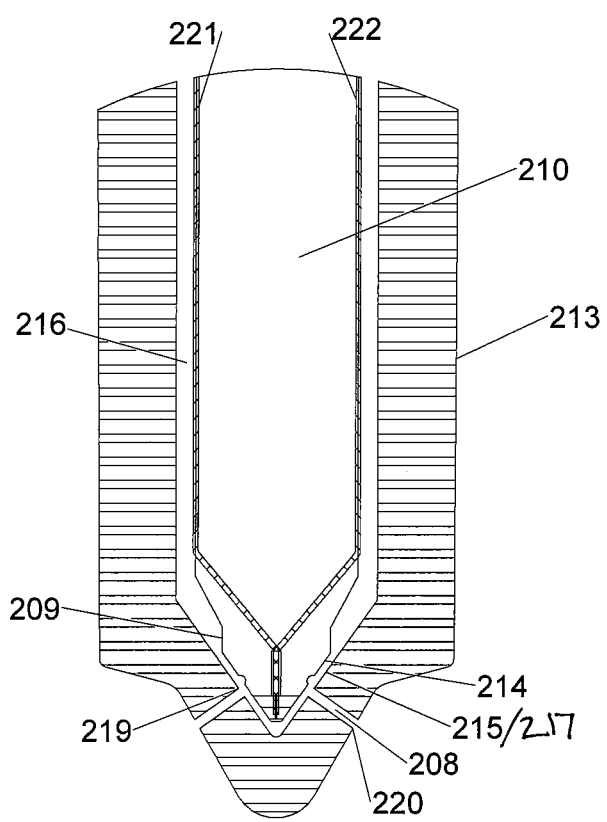
FIG. 10 is an enlarged cross section of the nozzle showing the needle in the raised position, separated from contact with the seat, thereby opening the orifices to fluid flow.

As one example, referring to FIGS. 9-10, each orifice 208 will have an internal edge 219 and an external edge 220. The fluid inside the reservoir 216 is typically pressurized into the range of about 20,000 psi to 30,000 psi. When the needle 210 rises to allow fluid flow, the pressurized fluid flows past the seat 217, through the orifice 208 and into the chamber 218. As the fluid flows past the internal edge 219 of the orifice 208, the pressure drops substantially, causing cavitation to occur inside the orifice 208 between the internal edge 219 and the external edge 220. This cavitation forms within microseconds of the needle 210 losing contact with the seat 217 at the beginning of the fuel injection pulse, and the cavitation disappears within microseconds of the needle 210 contacting the seat 217 at the end of the fuel injection pulse. Consequently, in each fuel injection pulse, the time duration of the cavitation's existence is a very accurate approximation of the actual time duration of the fuel injection pulse.

The fuel injection feedback system generally comprises an optical sensor 222 and a computing device electronically connected to the optical sensor 222. The optical sensor 222 is disposed inside a fuel injector 205, said fuel injector 205 having a nozzle 207 with an orifice 208, said optical sensor 222 oriented to receive light from within the fuel injector 205. The computing device is configured to detect a disturbance in the intensity of light received by the optical sensor 222 as a function of time. The computing device is any computer or electronic device capable of detecting changes in the intensity of light received by the sensor and computing the time duration of such light disturbance. It should be appreciated that many such computing devices are known in the art, as discussed above. The light "disturbances" are a variance in the intensity of light received by the optical sensor 222. Generally, the beginning of a light disturbance indicates the start of an injection pulse, and the end of the disturbance indicates the end of the injection pulse. For example, the start of the disturbance can indicate the formation of cavitation, thus indicating the start time of the fuel injection pulse. The disappearance of the light disturbance then indicates the disappearance of the cavitation, thus indicating the stop time of the fuel injection pulse. The computing device compares the start time and stop time of the cavitation to calculate the time duration of the existence of the cavitation, and therefore the approximate duration of the injection pulse. The computing device can then calculate the approximate volume of injected fuel using this time duration and the volumetric flow rate indicated by a flow meter fluidly connected to the fuel injector 205.

In one embodiment, the computing device can also detect the rate shape of intensity of light received from the optical sensor 222. This rate shape corresponds to the rate shape of fuel injected in the corresponding pulse of fuel, which correlates to the rate of combustion burn. The rate of combustion burn determines the fuel efficiency of the combustion, and with this information the fuel injector 205 can be optimized for efficiency in both fuel consumption and emissions.

In another embodiment, the fuel injection feedback system comprises a light source 221 disposed inside a fuel injector 205, an optical sensor 222 disposed inside a fuel injector, and a computing device electronically connected to the optical sensor 222. The light source 221 is a device configured to emit light capable of being reflected by cavitation. For example, the light source 221 could be a laser, one or more LED lights, an emitting fiber of a fiber optic assembly, or any other source of light. It should be appreciated that the light source 221 could be disposed on or within the needle 210, on the interior surface 215 of the housing 213, or at a variety of locations inside the fuel injector 205. The fuel injection feedback system is not limited to any specific location of the light source. The optical sensor 222 is a device configured to receive light from its surroundings. For example, the optical sensor 222 is configured to detect an intensity of light caused by receiving light reflected from cavitation.

In one exemplary embodiment, a light source 221 inside the fuel injector 205 is used to direct light toward the internal edge 219 of the orifice 208. The light source 221 is configured to emit a constant intensity of light, and the sensor 222 will receive a constant intensity of light reflected from within the fuel injector 205 when no cavitation is present. When the cavitation forms near the internal edge 219, the cavitation begins reflecting the light instantly upon formation, and the light sensor 222 inside the fuel injector 205 receives the additional light reflected from the cavitation.

In some applications, the light emitted from the light source 221 may be reflected from the exterior surface 214, the interior surface 215, or other internal components of the fuel injector 205. These reflections may cause optical interference with the optical sensor 222, causing the computing device to detect light disturbances that are not caused by reflections from cavitation. Thus, to enhance performance of the system by minimizing optical interference, it may be advantageous to apply a non-reflective coating to the exterior surface 214 and interior surface 215 in the vicinity of the light source 221 and optical sensor 222. This non-reflective coating will absorb light emitted from the light source 221, leaving the cavitation as the only reflective element in the vicinity of the light source 221 and optical sensor 222. Consequently, the only light disturbance detected by the computing device will be those caused by cavitation. By way of example and not limitation, one such non-reflective coating could be any carbon-based paint or other coating, or a chemical etching that darkens the exterior surface 214 and interior surface 215 in the vicinity of the light source 221 and optical sensor 222.

Figure 7:
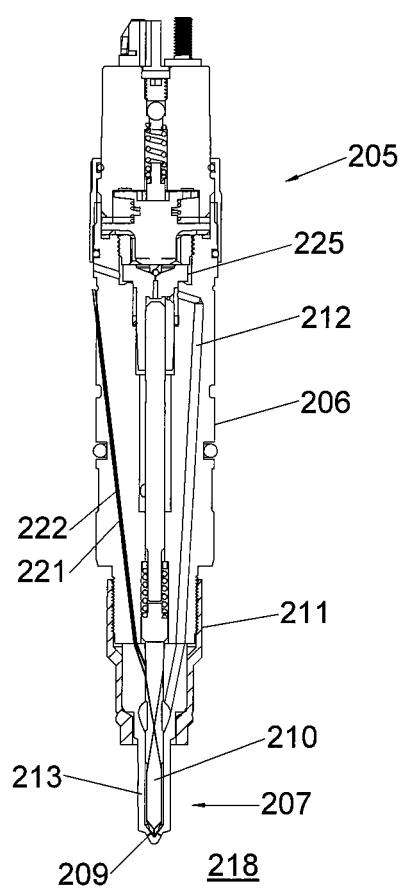
FIG. 7 is cross section A-A of a typical fuel injector having one embodiment of the fuel injection feedback system installed.
Figure 8:
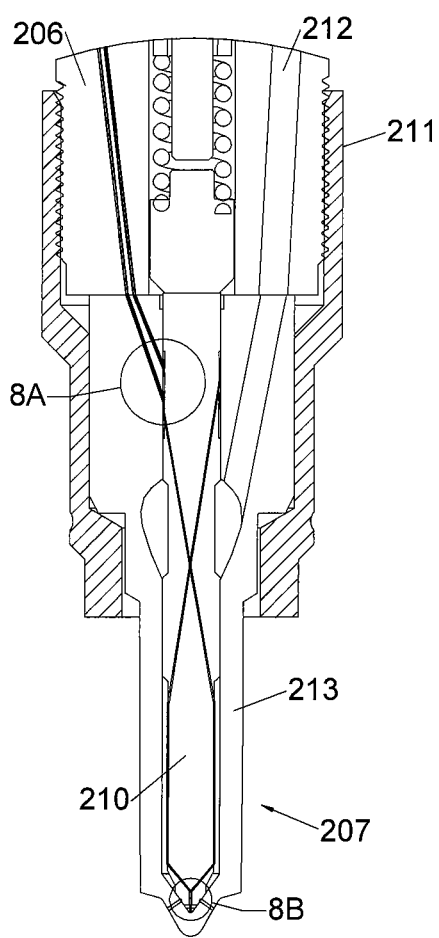
FIG. 8 is an enlarged cross sectional view of the tip of a typical fuel injector having one embodiment of the fuel injection feedback system installed.

In one embodiment, shown in FIGS. 7 and 8, the light source 221 and optical sensor 222 comprise a fiber optic assembly. That is, the light source 221 comprises an emitting fiber optic, and the optical sensor 222 comprises a detecting fiber optic. In this embodiment, fiber optic conduits 223 are drilled into the body 206 to facilitate installation of one or more strands of fiber optics. As shown in FIGS. 7 and 8, the nozzle 207 and needle 210 are also drilled as needed to create additional conduits 223 for installation of fiber optic fibers.

Figure 8A:
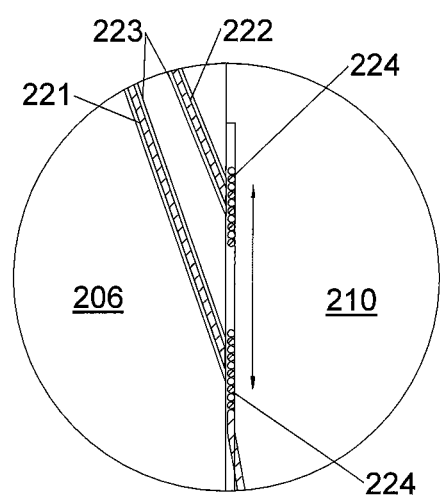
FIG. 8A is an enlarged cross sectional view of a portion of the nozzle having one embodiment of the fuel injection feedback system installed.
Figure 8B:
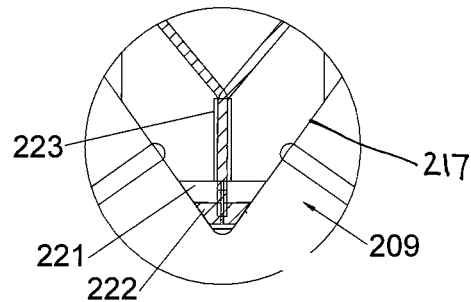
FIG. 8B is an enlarged cross sectional view of the tip of a fuel injector, showing the placement of emitting and receiving fiber optics in one embodiment of the fuel injection feedback system.

In this embodiment, the fiber optic assembly must accommodate the vertical oscillation of the needle 210 as it contacts and releases from the nozzle seat 217. In many fuel injectors, the needle 210 oscillation is +/−0.010 inches. Although this movement is of a small magnitude, over the course of time the movement can cause damage to the fibers of the fiber optics, in some cases rendering them inoperable. Thus, in at least one embodiment of the fiber optics assembly, shown in FIG. 8A, the fibers form a coil 224 around the external surface 214 of the needle 210. The fibers in the nozzle 207 terminate in close proximity to the coil 224 and are not physically connected to the coil 224. Light passing through the fibers of the coil 224 is emitted laterally and can be detected by the termination end of the fibers in the nozzle 207. Likewise, light emitting from the termination end of the fibers in the nozzle 207 enters the coil 224 and is transmitted through the fibers in the needle 210 to the tip 209. In this manner, the coil 224 creates optical connectivity between separate segments of the fibers, thereby accommodating the vertical oscillation of the needle 210.

In this embodiment, the needle 210 comprises a conduit 223 running longitudinally along the inside of the needle 210. The emitting and detecting fibers can be separately channeled through the needle 210, or they can be bundled along the channel, or arranged co-axially as shown in FIG. 2. In many fuel injectors 205, the needle 210 comprises a tip 209, which is a cap on the end of the needle 210. In these fuel injectors 205, the cap is removed, and the fiber optic assembly runs along the conduit 224 such that the ends of the emitting fiber and detecting fiber coincide with the tip 209 of the needle 210, thus being optically engaged with the interior of the nozzle 207. Optionally, the cap can be replaced with a hard, translucent material that forms a cap on the fiber optic fibers. Once such material is a quartz lens.

Figure 11:
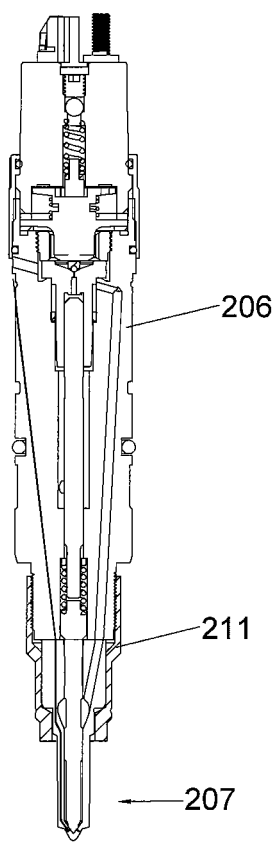
FIG. 11 is cross section A-A of a typical fuel injector having one embodiment of the fuel injection feedback system installed.
Figure 12:
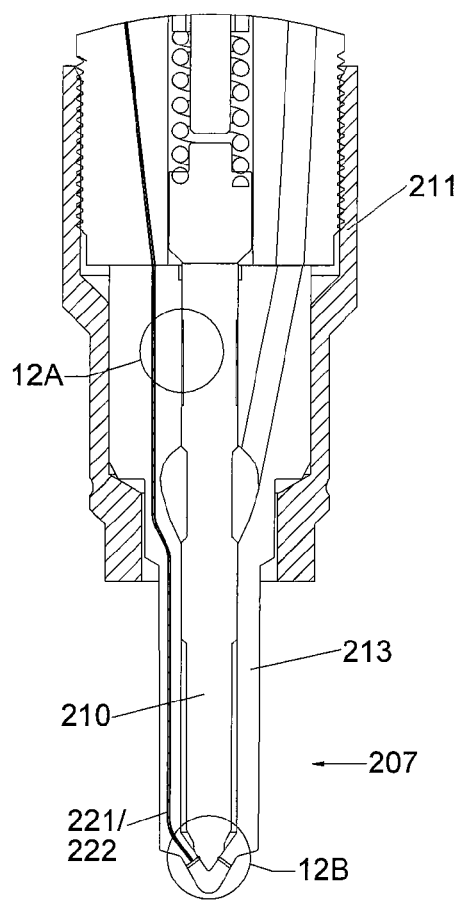
FIG. 12 is an enlarged cross sectional view of the tip of a typical fuel injector having one embodiment of the fuel injection feedback system installed.
Figure 12A:
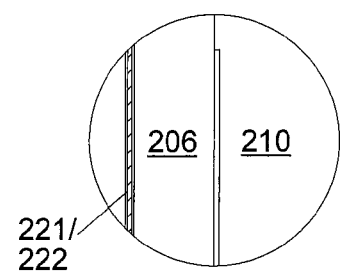
FIG. 12A is an enlarged cross sectional view of a portion of the nozzle having one embodiment of the fuel injection feedback system installed.
Figure 12B:
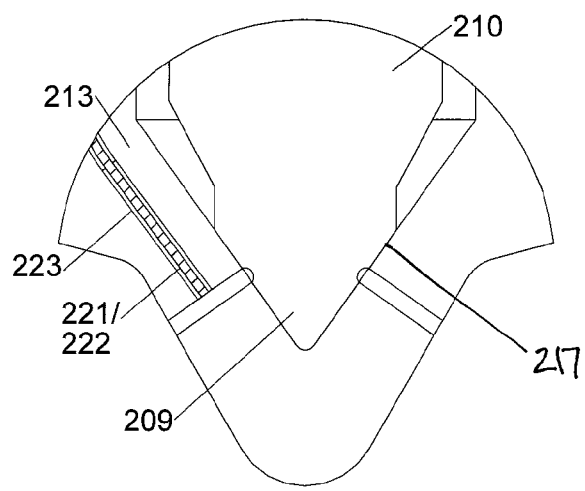
FIG. 12B is an enlarged cross sectional view of the nozzle, showing the placement of one embodiment of the fuel injection feedback system.
Figure 13:
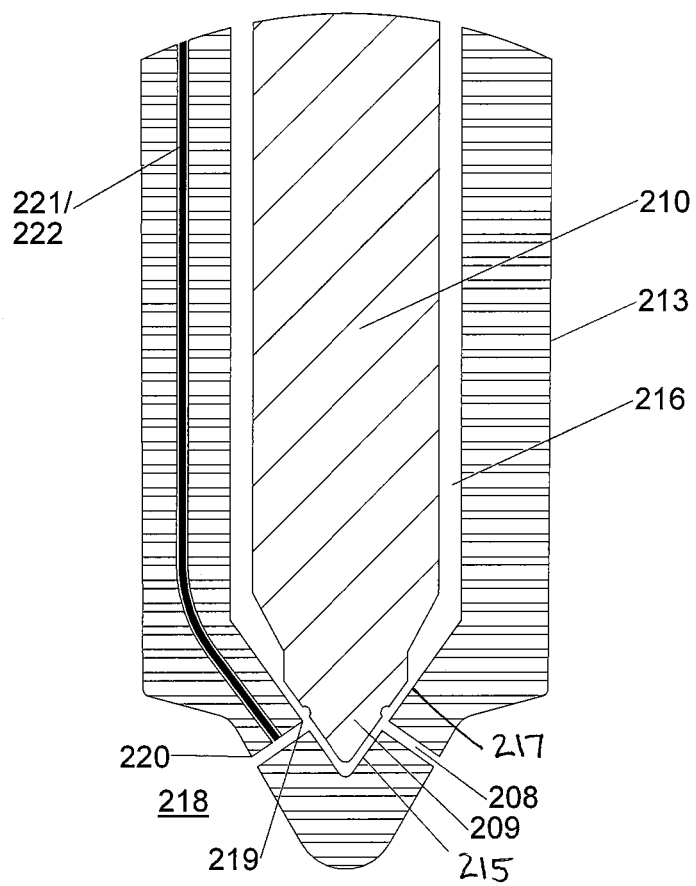
FIG. 13 is a further enlargement of the view show in FIG. 12B.

In another embodiment, shown in FIGS. 11-13, the conduit 223 for the fiber optic assembly is disposed in a wall of the body 206 and through a wall of the nozzle 207 until the conduit 223 intersects an orifice 208. The emitting fibers and detecting fibers are installed into the conduit 223, thereby avoiding the need to integrate the fiber optics with the needle 210. This arrangement avoids the difficulty and complexity of accommodating the vertical oscillation of the needle 210 during operation of the fuel injector 205. In this embodiment, the light source 221 and optical sensor 222 fiber optics are used to detect the presence of cavitation occurring within the orifice 208, thereby approximating the duration of the injection pulse.

Figure 14:
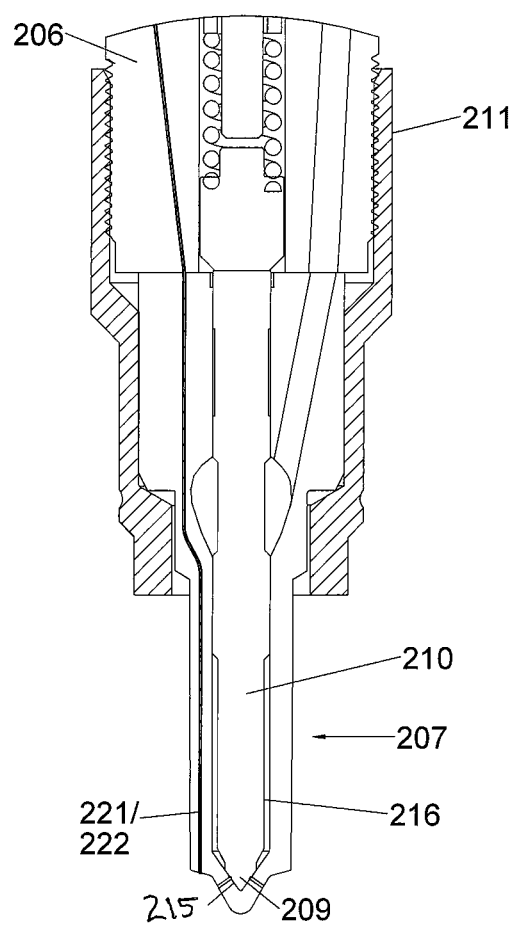
FIG. 14 is an enlarged cross sectional view of a portion of the nozzle having one embodiment of the fuel injection feedback system installed.
Figure 15:
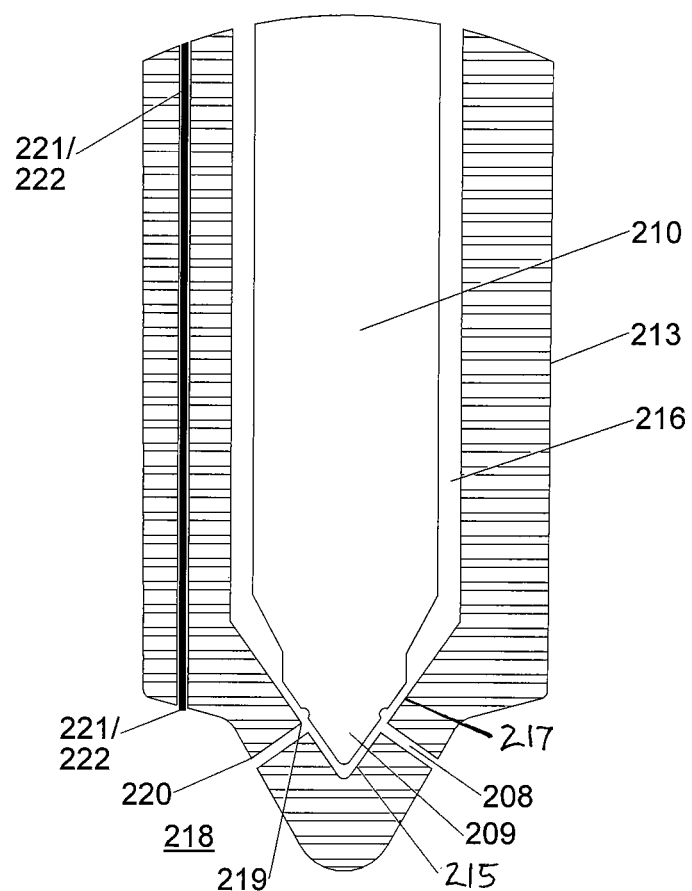
FIG. 15 is an enlarged cross sectional view of the nozzle, showing the placement of one embodiment of the fuel injection feedback system.

In another embodiment, shown in FIGS. 14-15, the optical sensor 222 is disposed in the fuel injector 205 and oriented in a manner permitting the optical sensor 222 to directly receive light from outside the injector 205. For example, the optical sensor 222 is disposed in the nozzle 207 such that the sensor 222 has direct optical connectivity with the exterior of the injector 205. This orientation of the sensor 222 permits the sensor to directly receive light emitted from combustion occurring in the chamber 218. The computing device then detects disturbances in the intensity of light received directly by the sensor 222 from the combustion external to the injector 205. This embodiment could comprise a conduit 223 running through a wall of the nozzle 207, providing optical and electronic connectivity between the optical sensor 222 and the computing device. The optical sensor 222 in this embodiment can comprise one or more detecting fibers of a fiber optics assembly.

In a variation of this embodiment, a light source 221 is also disposed in the fuel injector 205 in an orientation permitting the light source 221 to direct light to the cavitation plume emitted from the injector 205 during an injection pulse. As one example, the light source 221 is disposed within the nozzle 207 at an orientation permitting the light source 221 to have direct optical connectivity to the external cavitation plume. For example, the light source 221 could be an emitting fiber of a fiber optic assembly disposed in a conduit 223 running through the nozzle 207. The light source 221 directs light towards the external cavitation plume, and the optical sensor 222 receives the light reflected from the external cavitation plume, and the computing device detects the corresponding disturbance in intensity of light received by the sensor 222, as described above.

Other embodiments can comprise other devices to accomplish the same purpose as these fiber optic assemblies in any of the embodiments above. For example, the light source 221 and optical sensor 222 could comprise the light emitting diodes and diode detectors, respectively. Other light sources 221 and optical sensors 222 could be used where appropriate or desirable.

In another embodiment, the fuel injection feedback system can be implemented inside any type of electronic or mechanical fuel injector 205 without a light source 221. Instead, this embodiment comprises an optical sensor 222 disposed inside a fuel injector, and a computing device electronically connected to the optical sensor 222. The optical sensor 222 is positioned in the line-of-site ("LOS") of the chamber 218 via one of the orifices 208 for real time analysis of homogeneous fuel burn. The LOS technique permits monitoring of the rise and fall of light intensity from the combustion burn itself. This measuring technique allows the equilibrium of cycle to cycle (or pulse to pulse) deviation patterns to be predicted and electronically adjusted for consistent timing and dosing volumes. Since the optical sensor 222 receives light from the combustion, no light source 221 is required in this embodiment.

In any of the foregoing embodiments, once the time duration of cavitation is determined, the computing device can then calculate the approximate volume of injected fuel using this time duration and the volumetric flow rate indicated by a flow meter fluidly connected to the fuel injector 205. Using this method, the performance of the fuel injector 205 can be tested inside an operating engine without removing the fuel injector 205 from the engine.

Generally, the method for obtaining feedback from a fuel injector 205 comprising the steps of installing an optical sensor 222 inside a fuel injector 205, configuring the optical sensor 222 to receive light from inside the fuel injector 205, determining a start time of the fuel injection pulse by detecting the occurrence of a disturbance in the intensity of light received by the optical sensor 222, determining a stop time of the injection pulse by detecting the disappearance of the disturbance in the intensity of light received by the optical sensor 222, and determining the duration of the injection pulse by using a computational device to compare the time difference between said stop time and said start time.

Another embodiment of the method of obtaining feedback from a fuel injector comprises the steps of introducing light into the interior of a fuel injector 205 from a light source 221 located inside the fuel injector, determining a start time of the occurrence of cavitation inside the fuel injector 205 by using an optical sensor 222 inside the fuel injector 205 to detect the start of a disturbance in the intensity of light received by the optical sensor 222 from the inside the fuel injector, determining a stop time of the occurrence of cavitation inside the fuel injector 205 by using the optical sensor 222 to detect the end of the disturbance in the intensity of light received from the inside of the fuel injector, and determining the duration of the cavitation by using a computational device to compare the time difference between said stop time and said start time.

The light disturbance caused by cavitation may be captured via a digital (binary) or analog signal. The difference between these measuring methods is that the digital format will measure the signal at given intensity set point, whereas the analog will measure the rise and fall of the light intensity. The analog method may be used to measure the rate of injection by measuring the rate of light intensity over time (from darkness to brightness) to determine and calculate the rate of fuel being dosed (injected) over time. The same is done in reverse to measure the fall or the stop time of injection.

In another variation of this embodiment, the method comprises the steps of directing light emitted from a light source 221 inside the fuel injector 205 toward an orifice 208 in the nozzle 210 of the fuel injector, determining the start time of cavitation forming inside the orifice 208 by using a computational device to detect the beginning of a disturbance in the intensity of the light received by the sensor 222 from the inside of the fuel injector 205, determining the stop time of the cavitation by using the computational device to detect the end of the disturbance in the intensity of the light received by the sensor 222 from the inside of the fuel injector 205, and determining the duration of the cavitation by using the computational device to compare the time difference between said stop time and said star time.

In another embodiment, the method for obtaining feedback from a fuel injector 205 comprises the steps of installing an optical sensor 222 inside a fuel injector 205, configuring the optical sensor 222 to receive light from outside the fuel injector 205, determining a start time of the fuel injection pulse by detecting the occurrence of a disturbance in the intensity of light received by the optical sensor 222, determining a stop time of the injection pulse by detecting the disappearance of the disturbance in the intensity of light received by the optical sensor 222, and determining the duration of the injection pulse by using a computational device to compare the time difference between said stop time and said start time. This embodiment can further comprise the step of installing a light source 221 inside the fuel injector 205, configuring the light source 221 to direct light outside of the fuel injector 205. The method can further comprise the step of configuring the light source 221 to direct light to the external cavitation plume emitted from the injector 205.

In any of the foregoing embodiments of the method of obtaining feedback from a fuel injector, the method can further comprise the step of coating the exterior surface 214 or the interior surface 215 with a non-reflective coating. The method can further comprise the step of installing one or more conduits 223 in the body 206 or the housing 213 to accommodate the light source 221 apparatus or the optical sensor 222 apparatus.

The foregoing embodiments are merely representative of the system and method and not meant for limitation of the invention. For example, one having ordinary skill in the art would understand that the individual features of several disclosed embodiments are adaptable depending on the type of the fuel injector 205 and the arrangement of fiber optics equipment. Consequently, it is understood that equivalents and substitutions for certain elements and components set forth above are part of the invention described herein, and therefore the true scope of the invention is set forth in the claims below.

I claim:

1. A method of obtaining feedback from a fuel injector in a combustion engine, the method comprising the steps of:
   causing a light source disposed inside a fuel injector to direct light toward a location inside the fuel injector at which cavitation occurs;
   receiving, via an optical sensor disposed inside the fuel injector, light reflected from the cavitation;
   determining a start time of a fuel injection pulse by detecting the occurrence of a disturbance in the intensity of light reflected by the cavitation and received by the optical sensor;
   determining a stop time of the injection pulse by detecting the disappearance of the disturbance in the intensity of light reflected by the cavitation and received by the optical sensor; and
   determining the duration of the injection pulse by using a computational device to compare the time difference between said stop time and said start time.

2. The method of claim 1, further comprising the step of directing light, via a light source disposed inside the fuel injector, toward cavitation such that the light is reflected by the cavitation.

3. The method of claim 1, further comprising the step of combining the time duration of the injection pulse with the flow rate indicated by a flow meter, wherein said flow meter is adapted to measure the flow of liquid dispersed by the fuel injector.

4. The method of claim 2, further comprising the step of combining the time duration of the injection pulse with the flow rate indicated by a flow meter, wherein said flow meter is adapted to measure the flow of liquid dispersed by the fuel injector.

5. A method of obtaining feedback from a fuel injector in a combustion engine, the method comprising the steps of:
   installing an optical sensor inside the fuel injector;
   configuring the optical sensor to receive light reflected from cavitation; and
   configuring the optical sensor for communication with a computational device for detecting a disturbance in the intensity of light received by the optical sensor.

6. The method of claim 5, wherein the step of configuring the optical sensor to receive light reflected from cavitation further comprises the step of orienting the optical sensor to receive light reflected from cavitation occurring inside the fuel injector.

7. The method of claim 6, wherein the step of configuring the optical sensor to receive light reflected from cavitation further comprises the step of orienting the optical sensor to receive light from cavitation occurring near an orifice in the nozzle of the fuel injector.

8. The method of claim 5, wherein the step of configuring the optical sensor to receive light reflected from cavitation further comprises the step of orienting the optical sensor to receive light reflected from cavitation occurring outside the fuel injector.

9. The method of claim 5, wherein the step of installing the optical sensor further comprises the step of installing a conduit in a needle of the fuel injector, wherein the conduit is configured for receiving the optical sensor.

10. The method of claim 5, wherein the step of installing the optical sensor further comprises the step of installing a conduit in a wall of the nozzle of the fuel injector, wherein the conduit is configured for receiving the optical sensor.

11. A method of obtaining feedback from a fuel injector in a combustion engine, the method comprising the steps of:
installing a light source inside the fuel injector;
configuring the light source to direct light toward cavitation such that the light is reflected by the cavitation;
installing an optical sensor inside the fuel injector; and
configuring the optical sensor to receive light that is directed from the light source and reflected by the cavitation.

12. The method of claim 11, further comprising the step of configuring the optical sensor for communication with a computational device for detecting a disturbance in the intensity of light received by the optical sensor.

13. The method of claim 11, wherein the step of configuring the optical sensor to receive light further comprises the step of orienting the optical sensor to receive light reflected from cavitation occurring inside the fuel injector.

14. The method of claim 11, wherein the step of configuring the optical sensor to receive light further comprises the step of orienting the optical sensor to receive light reflected from cavitation occurring outside the fuel injector.

15. The method of claim 11, wherein the step of installing an optical sensor inside the fuel injector further comprises the step of installing a conduit in a needle of the fuel injector, wherein the conduit is configured for receiving the optical sensor.

16. The method of claim 11, wherein the step of installing an optical sensor inside the fuel injector further comprises the step of installing a conduit in a wall of the nozzle of the fuel injector, wherein the conduit is configured for receiving the optical sensor.

17. The method of claim 11, wherein the step of configuring the light source to direct light toward cavitation further comprises the step of orienting the light source to direct light toward cavitation occurring inside the fuel injector.

18. The method of claim 11, wherein the step of configuring the light source to direct light toward cavitation further comprises the step of orienting the light source to direct light toward cavitation occurring outside the fuel injector.

19. The method of claim 11, wherein the step of installing a light source inside the fuel injector further comprises the steps of installing a conduit in a needle of the fuel injector and configuring the conduit for receiving the light source.

20. The method of claim 11, wherein the step of installing a light source inside the fuel injector further comprises the steps of installing a conduit in a wall of the nozzle of the fuel injector and configuring the conduit for receiving the light source.

* * * * *